US005653150A

United States Patent [19]
Gignoux

[11] Patent Number: 5,653,150
[45] Date of Patent: Aug. 5, 1997

[54] PEDALLING DEVICE WITH SUSPENSION FOR CYCLES

[76] Inventor: Pierre Gignoux, La Faurie, F-38700 Le Sappey-en-Chartreuse, France

[21] Appl. No.: 515,132

[22] Filed: Aug. 15, 1995

[30] Foreign Application Priority Data

Sep. 8, 1994 [FR] France .................... 94 10935

[51] Int. Cl.$^6$ .......................... B62M 3/00; B62K 25/04
[52] U.S. Cl. .................. 74/594.1; 74/594.3; 280/259; 280/283
[58] Field of Search .................. 74/594.3, 594.1; 280/259, 275, 283

[56] References Cited

U.S. PATENT DOCUMENTS

| 5,060,536 | 10/1991 | Boys . | |
| 5,157,988 | 10/1992 | Pinkstock | 74/594.3 |

FOREIGN PATENT DOCUMENTS

| 431 701 | 9/1911 | France . | |
| 2335392 | 7/1977 | France | 74/594.1 |
| 2 409 183 | 6/1979 | France . | |
| 2516886 | 5/1983 | France | 280/259 |
| 2603862 | 3/1988 | France | 74/594.3 |
| 2921 | of 1892 | United Kingdom | 280/259 |
| 13987 | of 1900 | United Kingdom | 74/594.1 |
| 2089298 | 6/1982 | United Kingdom | 74/594.3 |
| WO 92/04230 | 3/1992 | WIPO | 280/259 |

*Primary Examiner*—Charles A. Marmor
*Assistant Examiner*—MarryAnn Battista
*Attorney, Agent, or Firm*—Oliff & Berridge

[57] ABSTRACT

A pedalling device, notably usable for all-surface bikes, comprises a pair of cranks in mechanical connection with a crank-gear spindle, and actuating means able to occupy a first pedalling state allowing direct mechanical transmission of the torque exerted by the pedals in the pedalling direction by means of a rigid coupling in rotation of the two cranks with respect to the transmission means, and a second shock-absorbing state making use of a suspension device procuring flexible coupling in rotation of the two cranks with respect to the frame when the user is pressing on both pedals exerting opposing forces without pedalling. The actuating means comprise a half-moon securedly united to the crank-gear spindle, and a cradle securedly united to the corresponding crank, in such a way as to be securedly united in the first conventional pedalling state, and independent from one another in the second state following a relative rocking movement determined by operation of the suspension device.

11 Claims, 19 Drawing Sheets

PEDALLING DEVICE WITH SUSPENSION FOR CYCLES

BACKGROUND OF THE INVENTION

The invention relates to a pedalling device for a pedal cycle, comprising:

- a first crank located on the right, and a second crank located on the left with respect to the support frame in the direction of forward movement of the cycle,
- a pedal articulated at the end of each crank on which the cyclist's leftor right foot presses,
- a crank-gear spindle in mechanical connection with the two cranks and associated to transmission means, having notably a toothed crown-wheel and a chain driving the rear wheel of the cycle.

Some known cycles comprise a telescopic suspension at the level of the rear wheel support frame. Fitting of such a suspension results in extra weight and gives rise to a pumping phenomenon which dissipates energy during the pedalling phase.

SUMMARY OF THE INVENTION

The object of the invention is to achieve a pedalling device procuring a rear suspension avoiding any pumping phenomenon during normal forward movement of the cycle.

The pedalling device according to the invention is characterized in that actuating means are arranged to occupy a first pedalling state allowing direct mechanical transmission of the torque exerted by the pedals in the pedalling direction due to a rigid coupling in rotation of the two cranks with respect to the transmission means, and a second damping state making use of a suspension device procuring a flexible coupling in rotation of the two cranks with respect to the frame, when the user is pressing on the pedals exerting opposing forces without pedalling.

The suspension device operates only when the cyclist is standing and pressing down on the pedals.

The suspension device is placed between the pedals and the crank-gear housing and performs the following two functions: on the one hand it enables direct transmission, without dissipation of energy, of the force exerted on the pedals and on the other hand it enables suspension of the rider pressing on both the pedals. The simplicity of design of the mechanism makes it very lightweight.

The device according to the invention uses the following principle: a rigid link between pedal and crank-gear ensures that the pedalling torque is fully transmitted, and a flexible link between the two pedals ensures the suspension of the rider pressing on his pedals.

According to one feature of the invention, the actuating means comprise a first operating part securedly united to the crank-gear spindle, and a second operating part securedly united to the corresponding crank, the two parts being rendered securedly united in the first conventional pedalling state, and being independent from one another in the second state following a relative rocking movement determined by operation of the suspension device.

The suspension device is housed in a cradle of the second operating part, and is achieved by means of a spring, a block made of elastomer material, or an oleo-pneumatic system, joined to the first operating part by a link rod, the suspension device being equipped with a prestress adjustment system to adjust the relative movement of the first and second parts according to the weight of the cyclist.

The device can be fitted on the left side of the cycle. In this case, the cyclist pressing on his pedals will have to position himself with his left foot to the rear in order to take advantage of the suspension.

The device can also be fitted on the right side of the cycle. In this case, the cyclist pressing on his pedals will have to position himself with his right foot to the rear in order to take advantage of the suspension.

The device can be fitted on both sides of the cycle, this solution giving the cyclist the possibility of positioning himself with either his right foot forwards or his left foot forwards, when pressing on the pedals.

The suspension device can make use of a single module, or of a pair of flexible modules with series, parallel or criss-cross arrangement.

The whole of the mechanism can be housed in a protective housing securedly united to the crank, the suspension device being able to be located outside or inside the protective housing. The articulation of the suspended crank can be coaxial or off-center with respect to the axis of the crank-gear.

According to one embodiment, the operating arm securedly united to the crank-gear spindle bears at its end an articulation spindle of the crank, the suspension device comprising a plurality of flection bars of elongated shapes fixed onto the operating arm by fixing means.

According to another embodiment, the crank-gear spindle can provide the suspension itself. Manufacturing the spindle from an elastic material means that this spindle will act as a torsion bar, another hollow spindle surrounding this spindle performing direct transmission of the pedalling effort.

According to a preferred embodiment, the suspension device is located on one side of the frame and is associated to the second crank articulated on the crank-gear spindle, and comprising in addition:

- a crown-wheel coupled to one of the ends of the crank-gear spindle and having at least one oblong hole in which a transmission rod securedly united to the second crank engages,
- a support plate of the toothed crown-wheel coupled in rotation on the other end of the crank-gear spindle,
- coupling means with rods to securedly unite the first crank to the plate,
- a drum mounted with free rotation and extending coaxially with respect to the crank-gear spindle, and the housing of the frame, the assembly being arranged to perform the suspension function with the right or left foot to the front.

BRIEF DESCRIPTION OF THE DRAWINGS

Other advantages and features will become more clearly apparent from the following description of several embodiments of the invention, given as non-restrictive examples only and represented in the accompanying drawings, in which.

DETAILED DESCRIPTION OF THE PREFERRED EMBODIMENT

Figure 1:
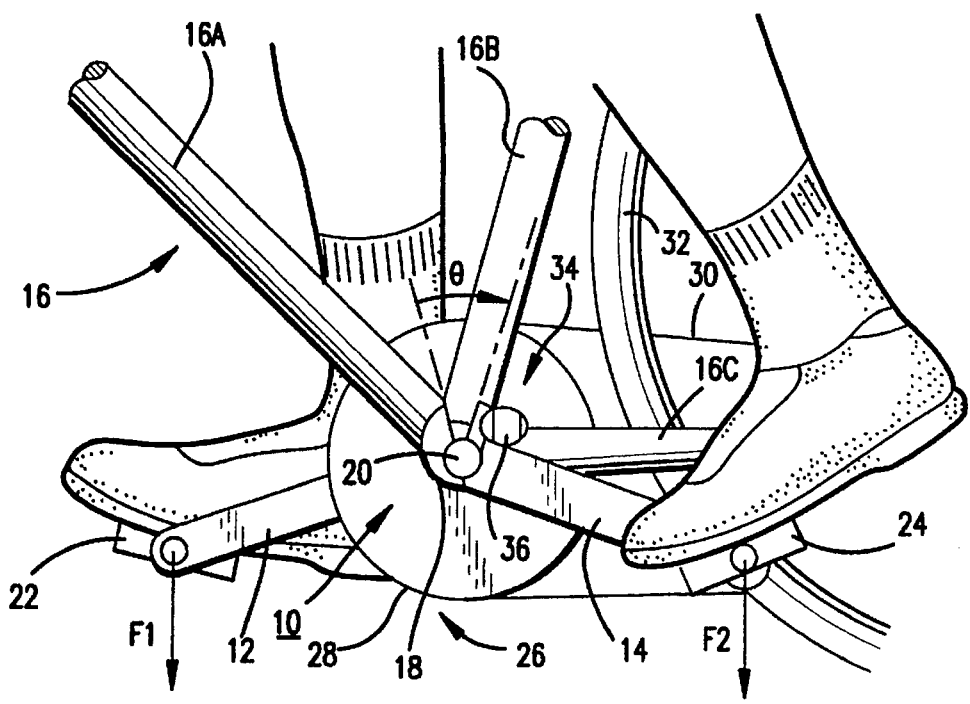
FIGS. 1 and 2 represent schematic perspective views of the pedalling device with suspension according to the invention, respectively in the suspension state when the user is pressing on the pedals in the standing position, and in the normal pedalling state.
Figure 2:
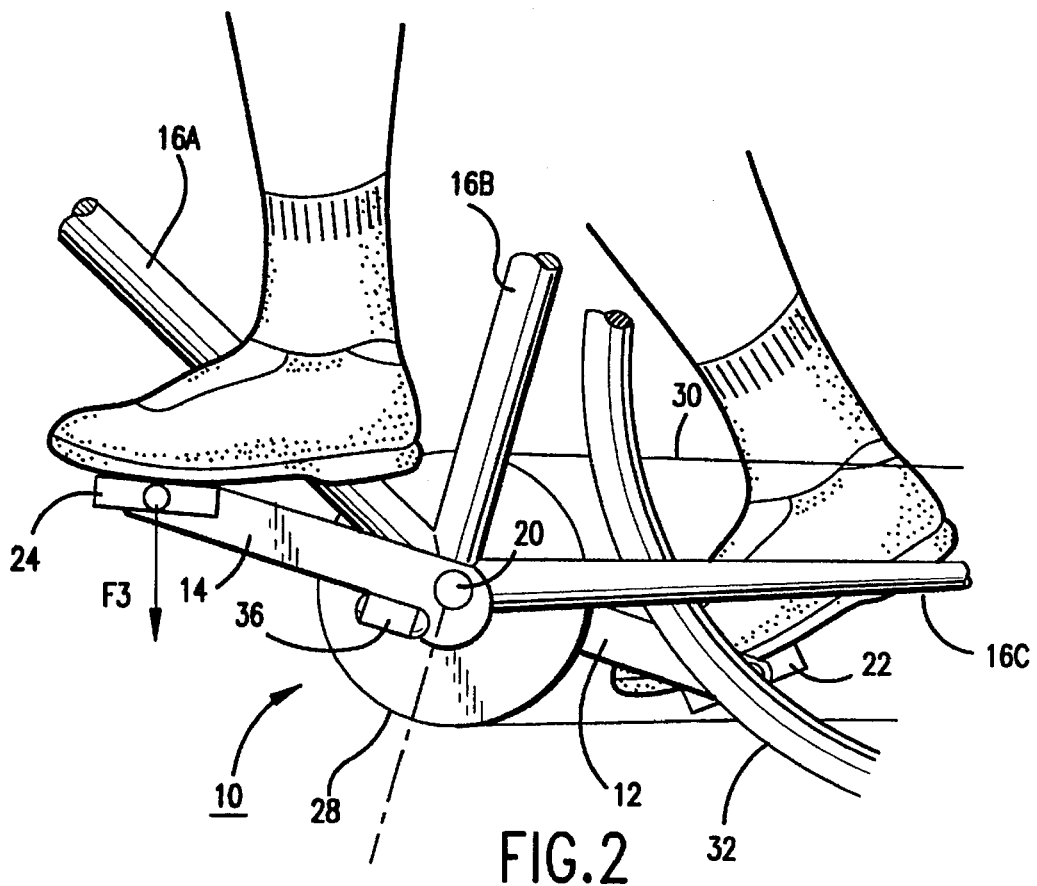

With reference to FIGS. 1 and 2, a pedalling device 10 for pedal cycles comprises a first crank 12 located on the right and a second crank 14 fitted on the left with respect to the support frame 16 in the direction of forward movement of the cycle. The support frame 16 is partially represented by three tubes 16A, 16B, 16C joined together at the bottom by a transverse tubular housing 18, through which there passes a crank-gear spindle 20 cooperating with the two cranks 12, 14.

Opposite the crank-gear spindle 20, the end of each crank 12, 14 is equipped with an articulated pedal 22, 24, on which the cyclist's left or right foot presses. The crank-gear spindle 20 is associated to transmission means 26 comprising a toothed crown-wheel 28 and a chain 30 driving the rear wheel 32 of the cycle.

According to the invention, the pedalling device 10 is equipped with actuating means 34 able to occupy a first state (FIG. 2) allowing direct mechanical transmission of the torque exerted by the pedals 22, 24 in the pedalling direction indicated by the arrow F3 by means of a rigid coupling in rotation of the two cranks 12, 14 with respect to the transmission means 26, and a second shock-absorbing state (FIG. 1) by means of a suspension device 36 enabling a flexible coupling in rotation of the two cranks 12, 14 with respect to the transmission means 26 to be obtained when the user is pressing on both pedals 22, 24 exerting opposing forces according to the arrows F1 and F2 without pedalling.

Figure 3:
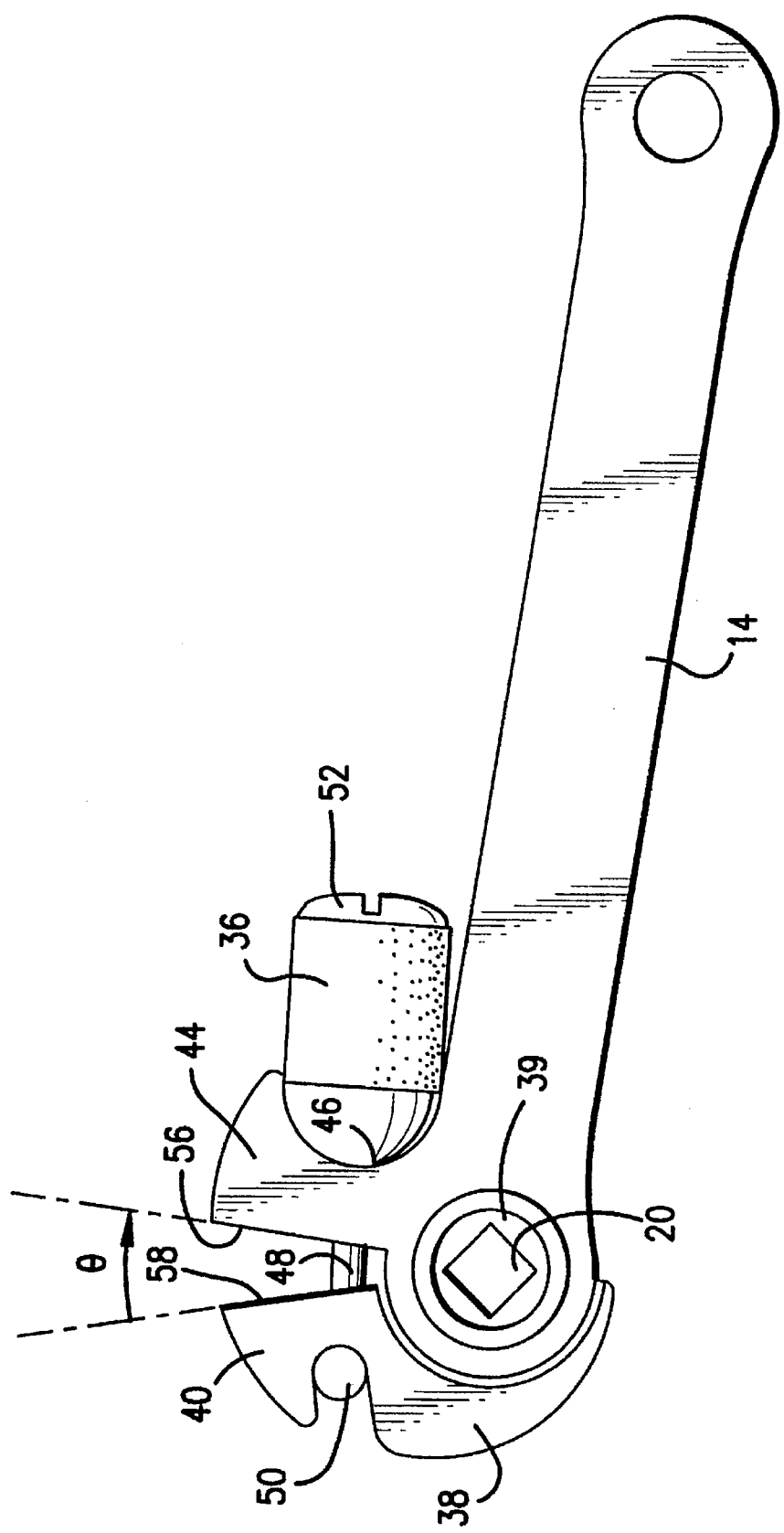
FIG. 3 shows an elevational view of a first embodiment of the actuating means of the suspension device located on the left side of the cycle, the assembly being represented in the active suspension position when the cyclist is pressing down on the pedals.
Figure 4:
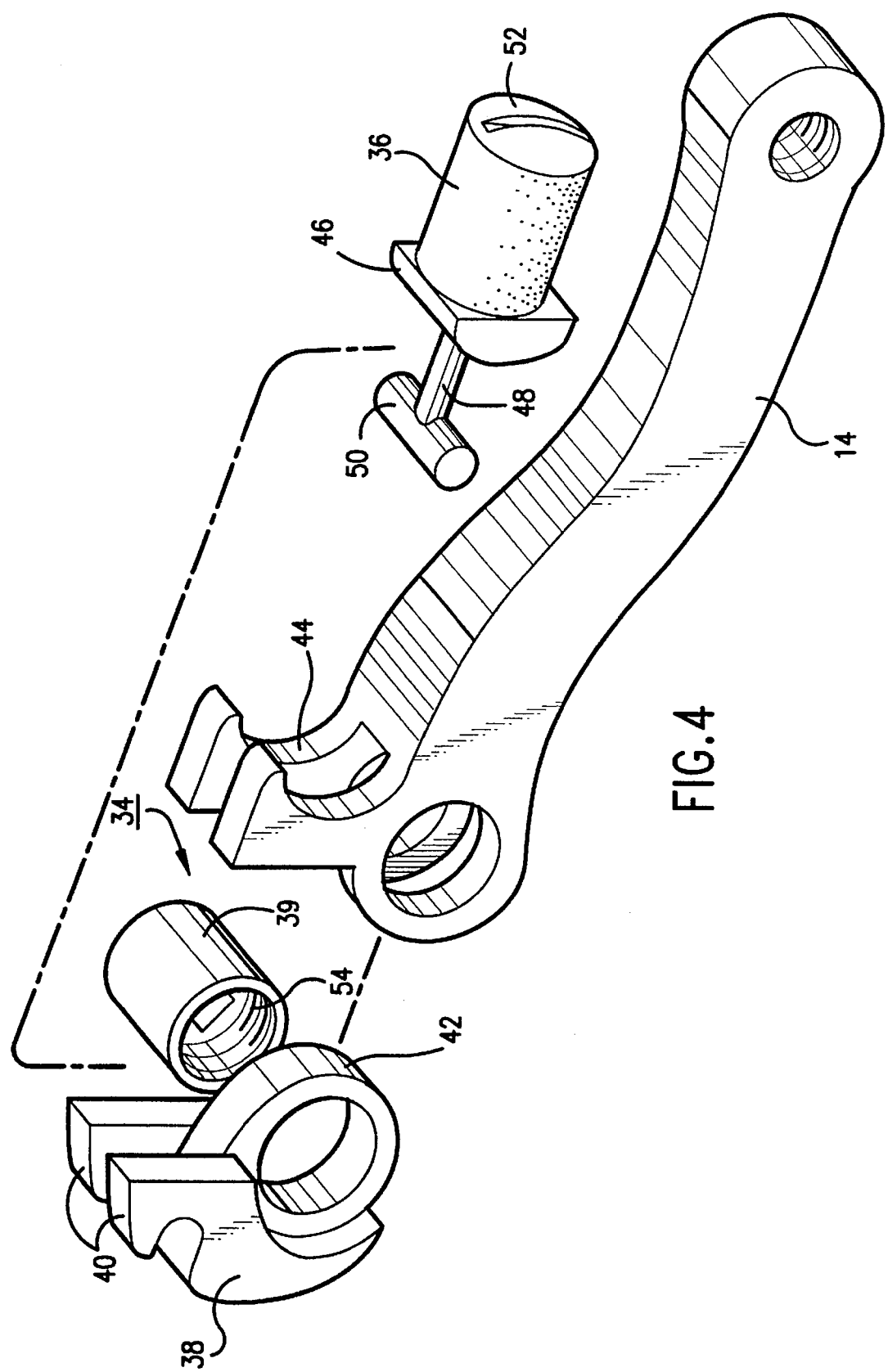
FIG. 4 is an exploded perspective view of the device of FIG. 3.

A first embodiment of the actuating means 34 of FIGS. 1 and 2 is represented in FIGS. 3 and 4. The actuating means 34 are located on the left side cooperating with the second crank 14 and the crank-gear spindle 20, and comprise a driving part 38 in the shape of a half-moon, securedly united to the pedalling device 10 by means of a coupling sleeve 39 with the crank-gear spindle 20. The driving part 38 is provided with a latching spur 40, and an annular fixing part 42 in which the coupling sleeve 39 is engaged. The second crank 14 is mounted with articulation on the sleeve 39 coaxially with the fixing part 42 and the crank-gear spindle 20, and is in addition provided with a cradle 44 for holding the suspension device 36.

The suspension device 36 can be achieved by means of a mechanical device with springs, or a block made of elastomer material, or an oleo-pneumatic system. Any other component or module having the elastic shock-absorption properties of a suspension can naturally be used.

The suspension device 36 comprises a base 46 in the form of a semi-cylindrical cap housed in the cradle 44, the assembly being fixed by a rod 48 equipped with a tenon 50 held behind the latching spur 40. An adjustment screw 52 enables the prestress of the suspension device 36 to be adjusted so as to set the depression of the actuating means 34 according to the cyclist's weight.

The inside of the cylindrical lateral surface of the coupling sleeve 39 is provided with a thread 54 enabling the actuating means 34 to be extracted by means of a crank extracting tool.

Operation of the pedalling device 10 according to FIGS. 1 to 4 is as follows:

In FIGS. 1 and 3, the cyclist is standing on the pedals 22, 24 and exerting opposing forces F1 and F2 which tend to move the driving part 38 and cradle 44 apart, and to open the articulation between the two cranks 12, 14 by an angle θ. The articulation is held by the suspension device 36 which is in the compressed state.

In FIG. 2, the cyclist is exerting a force F3 on the pedal 24 in the direction of forward movement. The active face 56 of the second crank 14 comes into engagement with the shoulder 58 of the half-moon, transmitting the actuating force to the crank-gear spindle 20 and transmission means 26.

Switching the actuating means 34 to the first state enables a rigid mechanical link to be obtained between the crank 14 and crank-gear spindle 20, ensuring transmission of the pedalling torque in full. Switching the opposite way to the second state results in a flexible link between the two pedals 22, 24 to ensure the suspension of the rider pressing down on the pedals 22, 24.

The actuating means 34 implement two elements between the pedal 24 and the crank-gear spindle 20, one fixed to the coupling sleeve 39 with the crank-gear spindle 20, and the other securedly fixed to the pedal 24 by means of the crank 14. The two elements are securely united to one another for conventional pedalling, and are independent from one another and linked by the suspension device 36 for the opposite effort.

Figure 5:
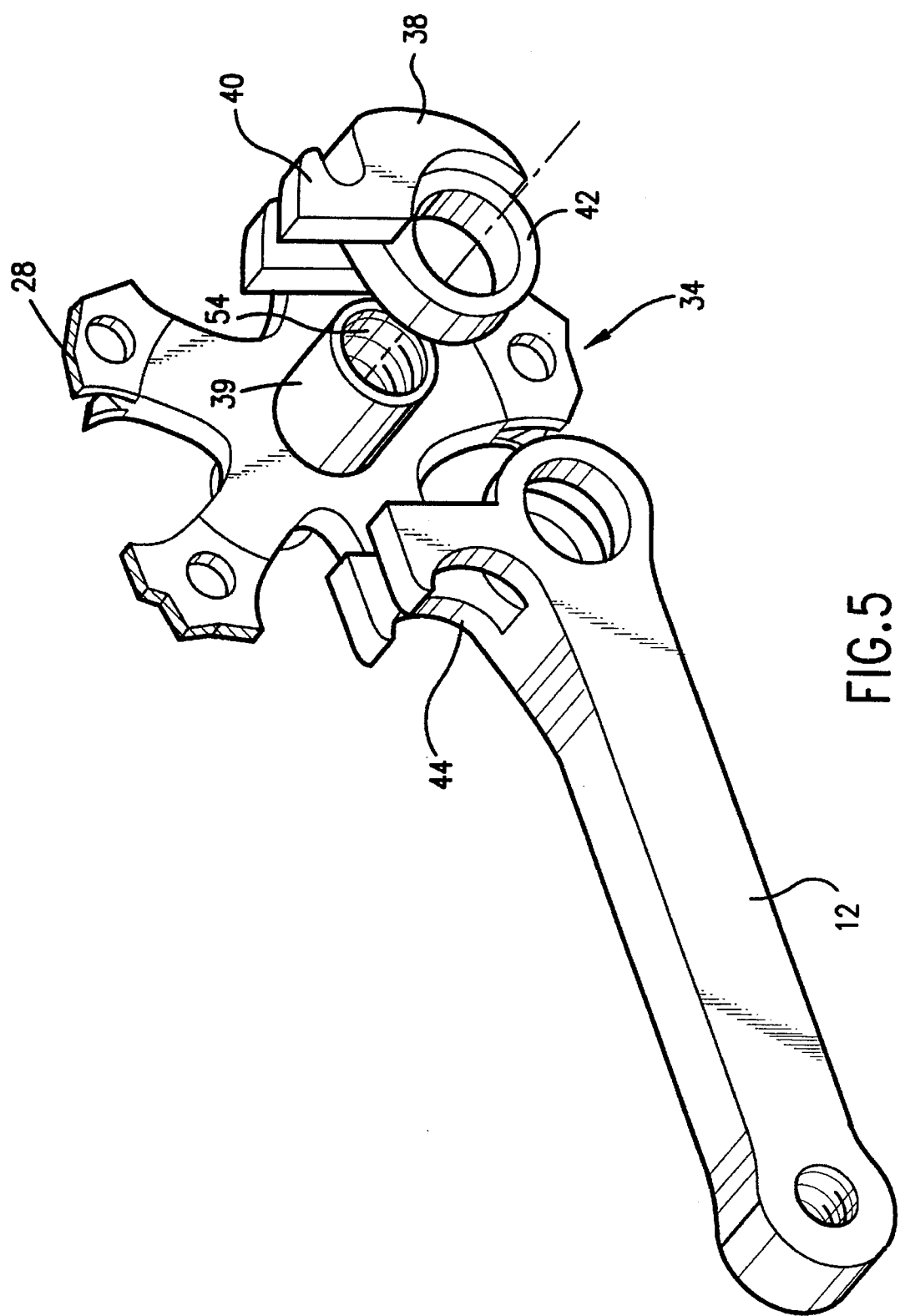
FIG. 5 is an identical view to FIG. 4, with the device fitted on the right side of the cycle, the shock absorber of the suspension device not being represented, but being identical to that of FIG. 4.

With reference to FIG. 5, the actuating means 34 fitted on the right side of the crank-gear spindle are practically identical to those fitted on the left in FIGS. 1 to 4. The same reference numbers will therefore be used for this alternative embodiment. The difference involves the coupling sleeve 39 fixed to the crank-gear spindle and supporting the toothed crown-wheel or crown-wheels 28 equipped with the transmission means 26. The suspension device 36 is not represented but it is identical to that of FIG. 3.

The presence of the actuating means 34 on the right side of the cycle requires the right foot to be positioned to the rear to take advantage of the suspension when the cyclist is pressing down on the pedals 22, 24.

Figure 6:
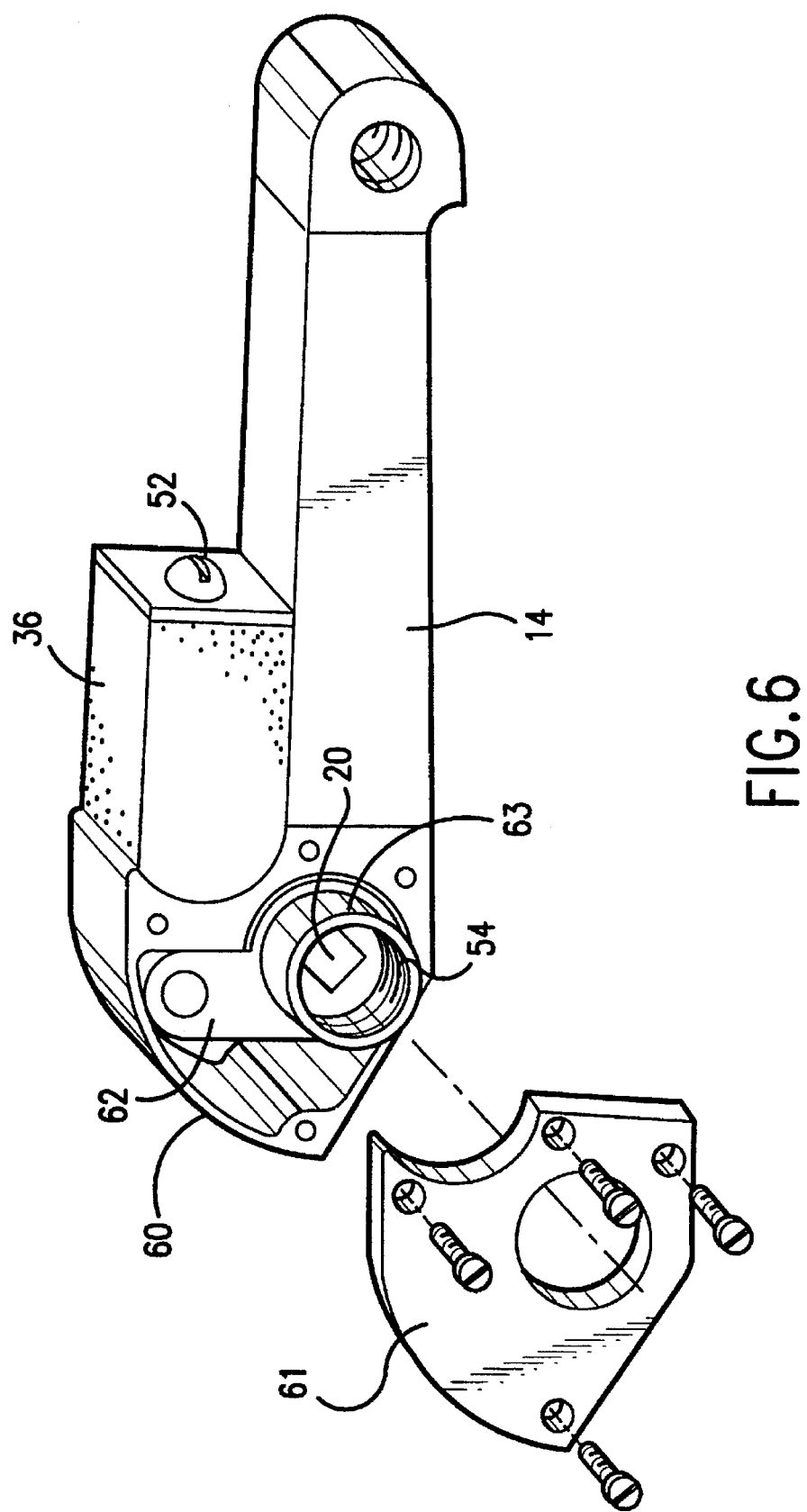
FIG. 6 is a semi-exploded perspective view of an alternative embodiment.
Figure 7:
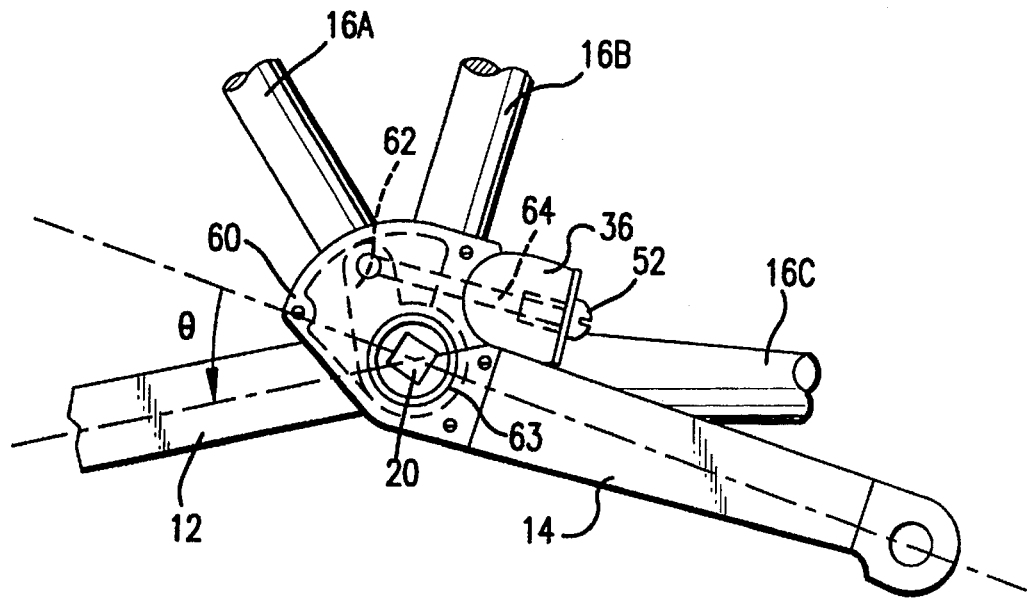
FIGS. 7 and 8 show elevational views of FIG. 6, respectively in the suspension state and in the pedalling state.
Figure 8:
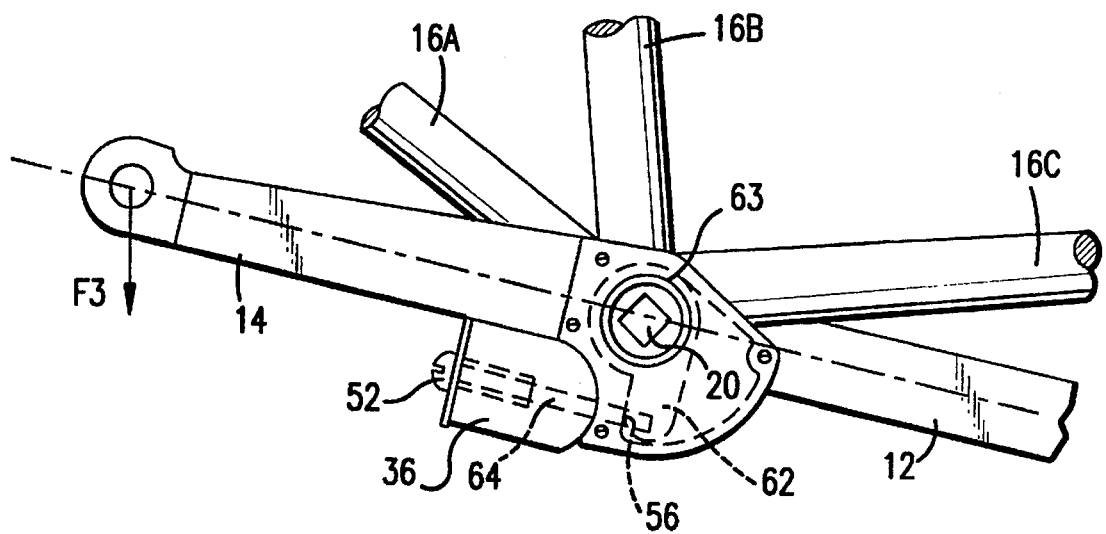

In FIGS. 6 to 8, the actuating means 34 are housed in a protective housing 60 with a closing cover 61 and are provided with an operating lever 62 securely united to the pedalling device 10 by means of the crank-gear spindle 20. The crank 14 is formed by an extension of the housing 60 and is articulated around an annular base 63 of the lever 62. The suspension device 36 is formed by a cubic block made of elastomer material mechanically linked to the operating lever 62 by a threaded rod 64. The elastomer block presses directly on the crank 14 outside the housing 60, and the base 63 comprises a thread 54 allowing the device to be extracted by means of a crank extractor.

The suspension function (FIG. 7) is obtained when the cyclist is standing pressing down on the pedals, resulting in an angular offset of value $\theta$ between the two cranks 12, 14, which is proportional to the forces or shocks exerted on the pedals. The operating lever 62 pivots counterclockwise with the spindle 20 with formation of a restoring torque between the cranks 12, 14 exerted following compression of the elastomer block. Adjustment of the prestress is achieved by turning the screw 52 as in the previous case. The pedalling function (FIG. 8) is operational when the cyclist pedals in conventional manner in the counterclockwise direction indicated by the arrow F3. The active surface 56 of the crank 14 drives the operating lever 62 and the crank-gear spindle 20 in the same rotation direction, followed by driving of the rear wheel by the transmission means 26 illustrated in FIG. 1. Such a device enables small overall dimensions to be achieved and provides a protected mechanism with easy adjustment of the damping force.

Figure 9:
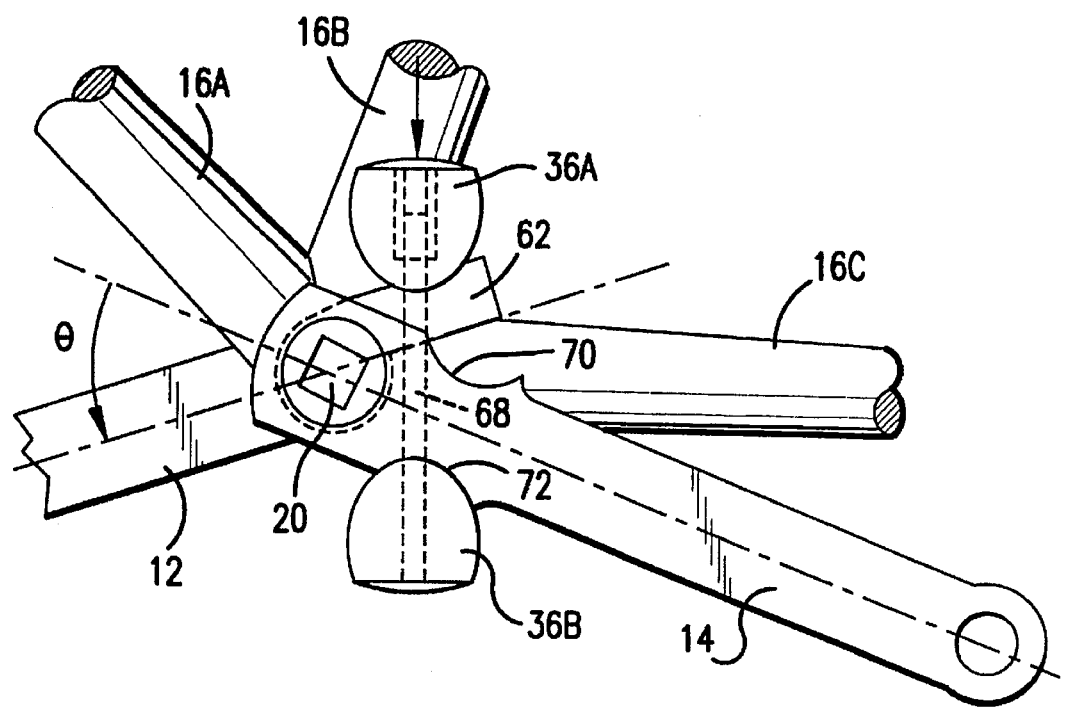
FIGS. 9 and 10 are identical views to FIGS. 7 and 8 of another alternative embodiment with a pair of elastic modules in series.
Figure 10:
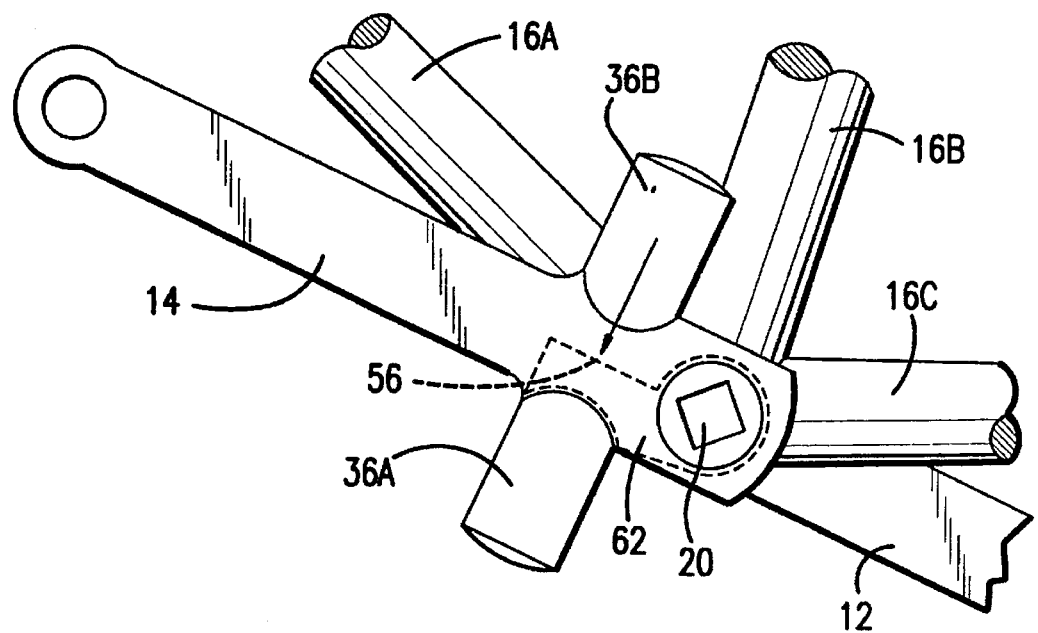

According to the alternative embodiment illustrated in FIGS. 9 and 10, the suspension device 36 comprises a pair of elastomer blocks 36A, 36B joined together by a common threaded rod 68 to form a series link. The first block 36A cooperates with the operating lever 62 securely united to the crank-gear spindle 20, and with a first cavity 70 of the crank 14. The second block 36B cooperates with a second cavity 72 of the crank 14 situated opposite the first cavity 70.

Operation of the device of FIGS. 9 and 10 is similar to that described previously, the restoring torque between the cranks 12 and 14 in the suspension function (FIG. 9) being exerted by compression of the two elastomer blocks 36A, 36B. For the pedalling function (FIG. 10), the active surface 56 of the crank 14 drives the operating lever 62 securely united to the crank-gear spindle 20.

The device of FIGS. 9 and 10 can naturally be fitted on the right side of the cycle.

Figure 11:
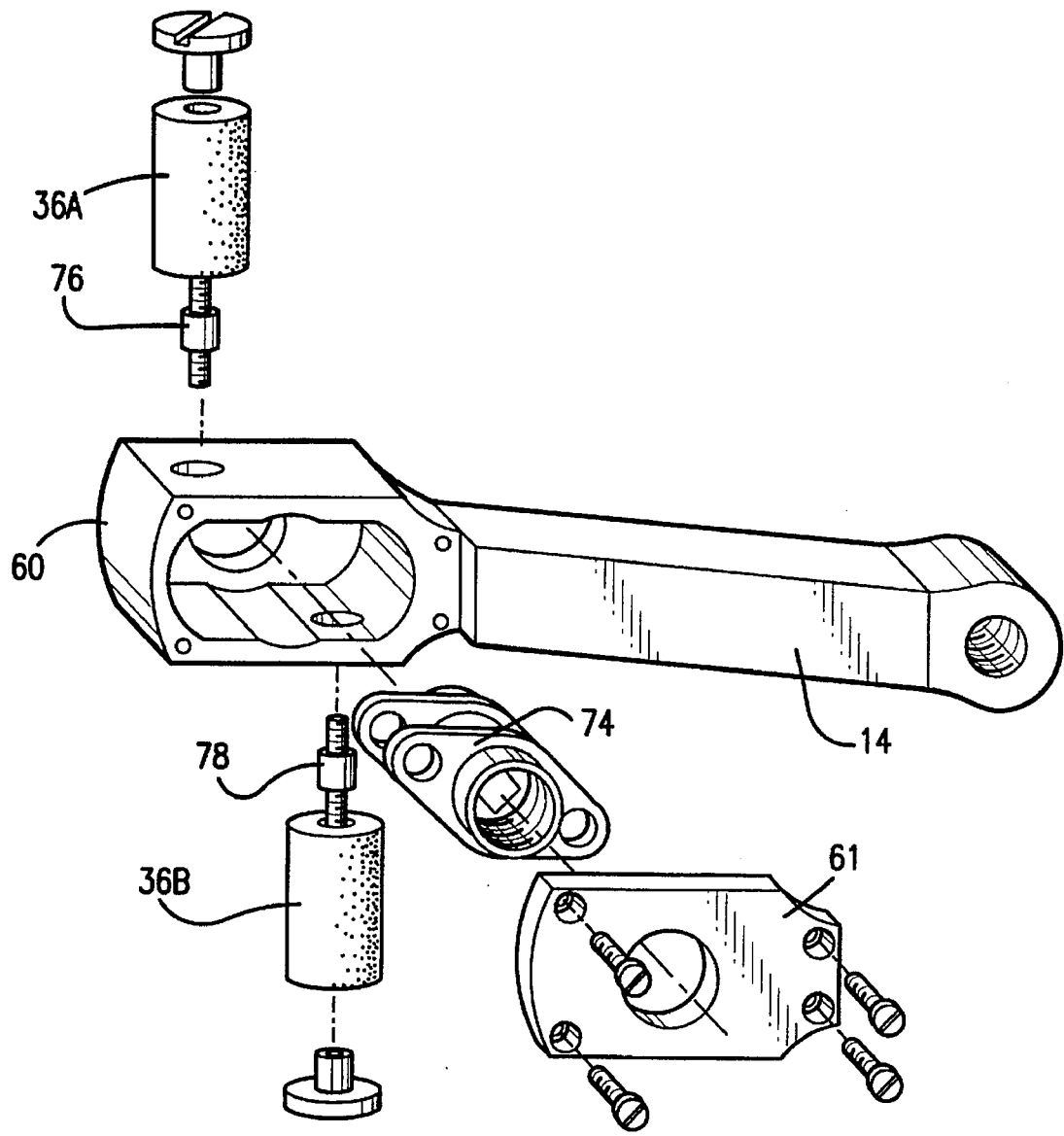
FIG. 11 is an exploded perspective view of another alternative embodiment, with a pair of elastic modules operating in parallel.
Figure 12:
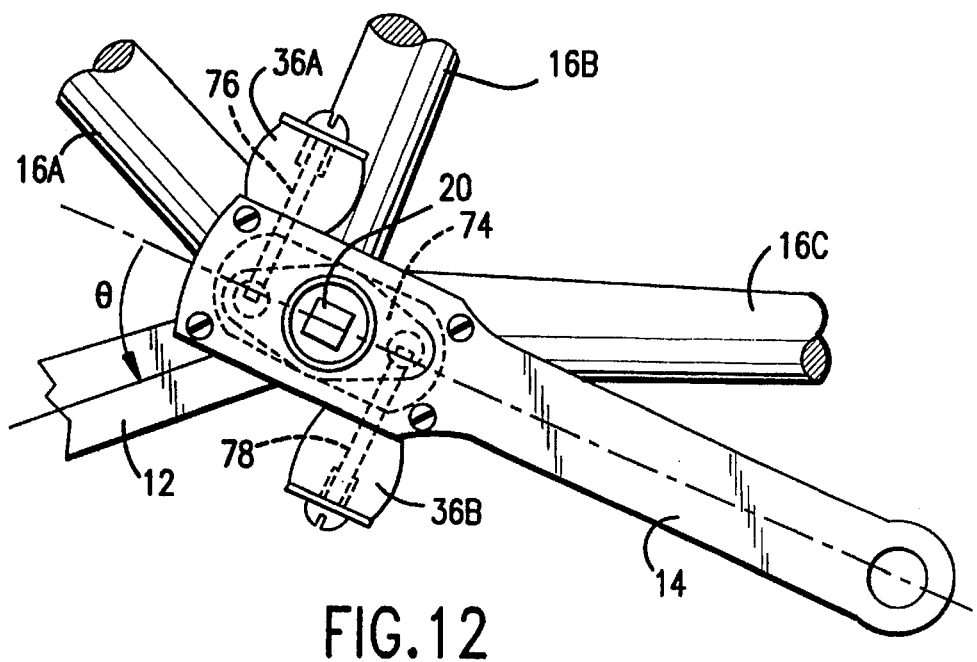
FIGS. 12 and 13 show the elevational views of the fitted device of FIG. 11, respectively in the suspension state and in the pedalling state.
Figure 13:
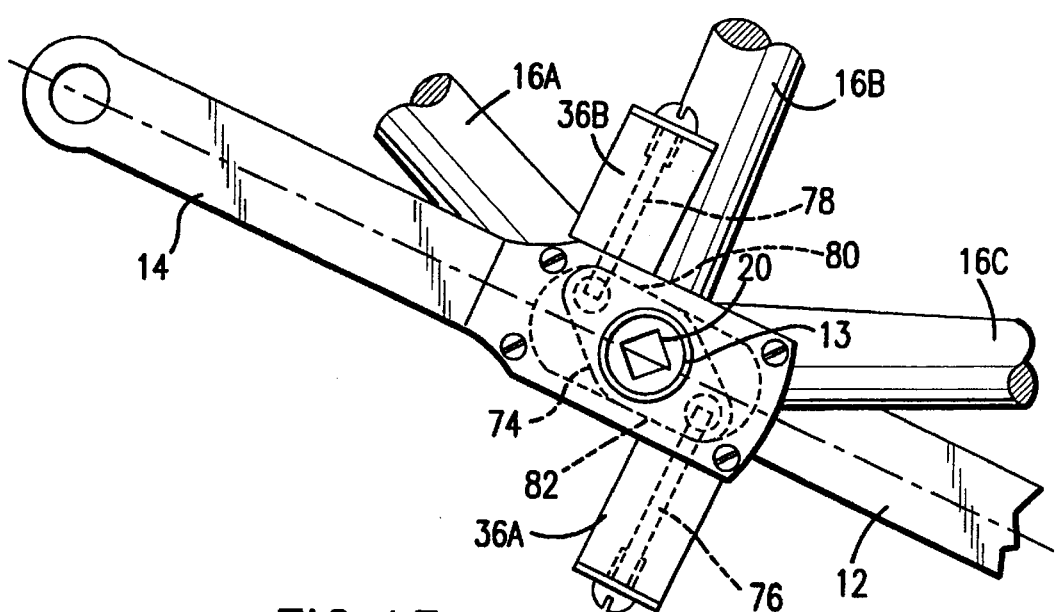

With reference to the alternative embodiment of FIGS. 11 to 13, the actuating means 34 comprise an operating fork 74 securedly united to the crank-gear spindle 20, the assembly being housed in a housing 60. The fork 74 cooperates with two threaded fixing screws 76, 78 of a pair of opposing elastomer blocks 36A, 36B forming the suspension device 36. The two blocks 36A, 36B work in parallel according to a suspension operation (FIG. 12) identical to that described previously. For the pedalling function (FIG. 13), the two active surfaces 80, 82 of the crank 14 drive the fork 74 securedly united to the crank-gear spindle 20. This results in a moderate effort on the bearings due to the balance of the forces with respect to the crank-gear spindle 20, said forces being exerted either by the elastomer blocks 36A, 36B in the suspension function or by the active surfaces 80, 82 in the pedalling function.

Figure 14:
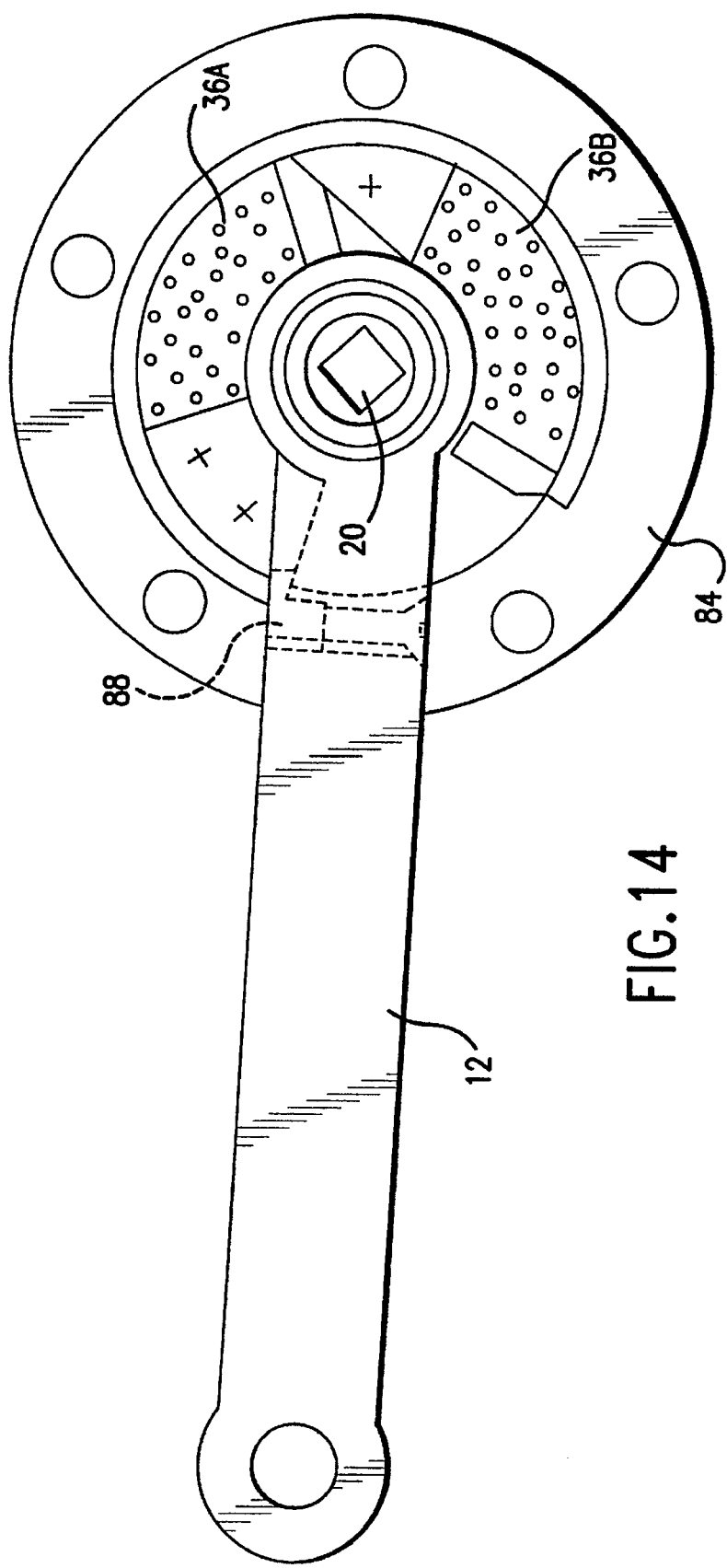
FIG. 14 shows an elevational view of another alternative embodiment with a circular mechanism fitted on the right side.
Figure 15:
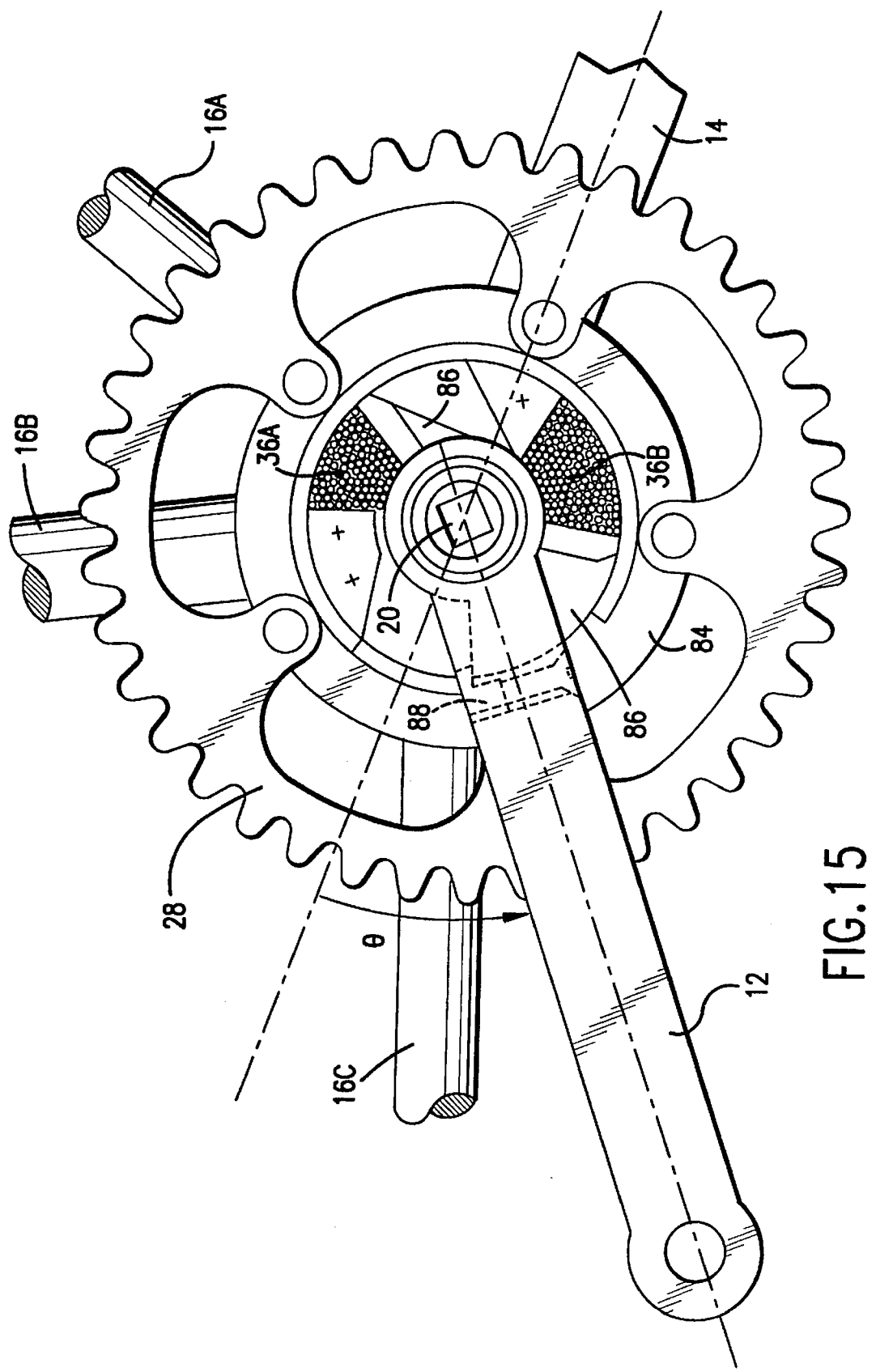
FIG. 15 represents the mechanism of FIG. 14 in the suspension state, the cage acting as support for the toothed drive crown-wheel.

With reference to FIGS. 14 and 15, the actuating means 34 are fitted on the right side, and are formed by an operating cage 84 securedly united to the toothed crown-wheel 28 and the crank-gear spindle 20. The first crank 12 is articulated around the circular cage 84, and the suspension device 36 comprises elastomer blocks 36A, 36B shaped as circular sections housed inside the cage 84. Each block 36A, 36B is pressing on one side on the cage 84 and on the other side on a star 86 articulated around the crank 12 and blocked in rotation by a key 88.

For the suspension function corresponding to movement of the crank 12 from the position illustrated in FIG. 14 to that of FIG. 15, the star 86 causes compression of the two elastomer blocks 36A, 36B inside the cage 84.

Figure 16:
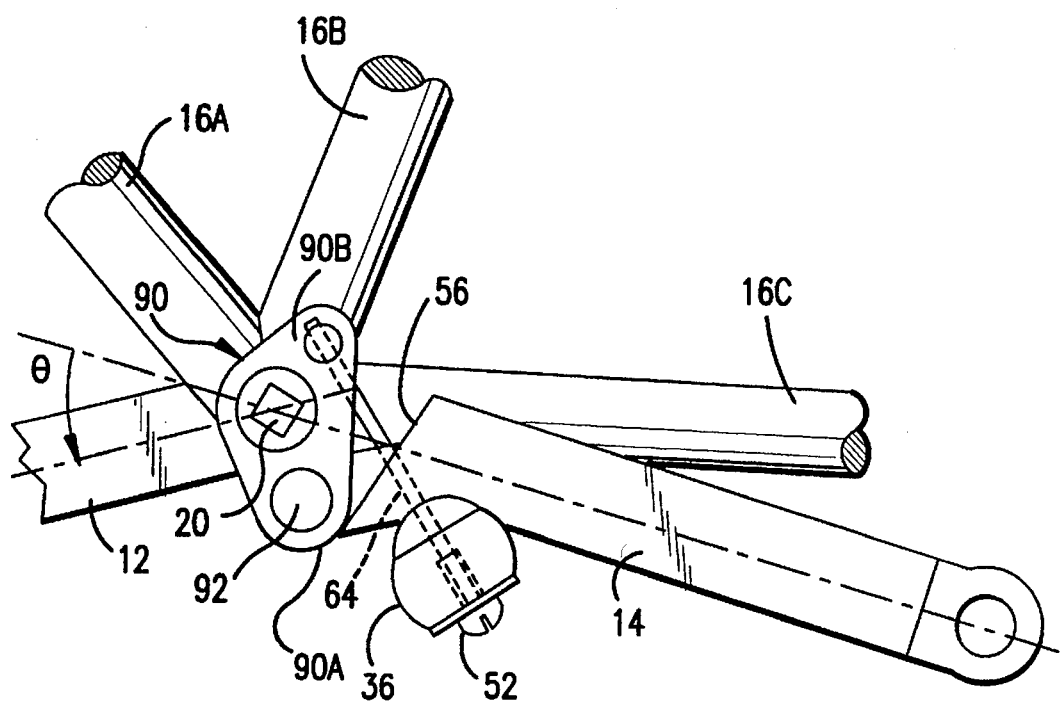
FIGS. 16 and 17 are identical views to those of FIGS. 7 and 8 of an alternative embodiment with off-centering of the articulation spindle of the crank with respect to the crank-gear spindle.
Figure 17:
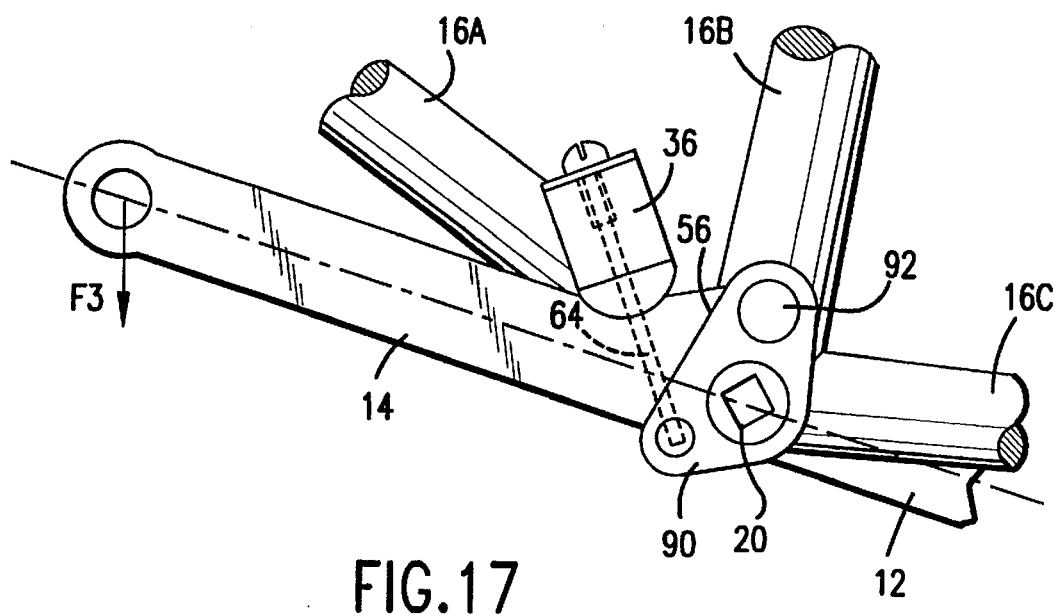

With reference to the alternative embodiment represented in FIGS. 16 and 17, an operating lever 90 is mounted coaxially on the crank-gear spindle 20 and comprises a first arm 90A on which the articulation spindle 92 of the crank 14 is arranged. The elastomer block of the suspension device 36 presses on the crank 14 and is mechanically linked to the second arm 90B of the operating lever 90 by a connecting rod 64. The articulation spindle 92 is off-center with respect to the crank-gear spindle 20.

The suspension function is similar to that described previously, with formation of an angular offset between the active surface 56 of the crank 14 and the corresponding edge of the lever 90 (FIG. 16), and compression of the elastomer block 36. The pedalling function remains invariable after driving of the lever 90 by the active surface 56 of the crank 14.

Figure 18:
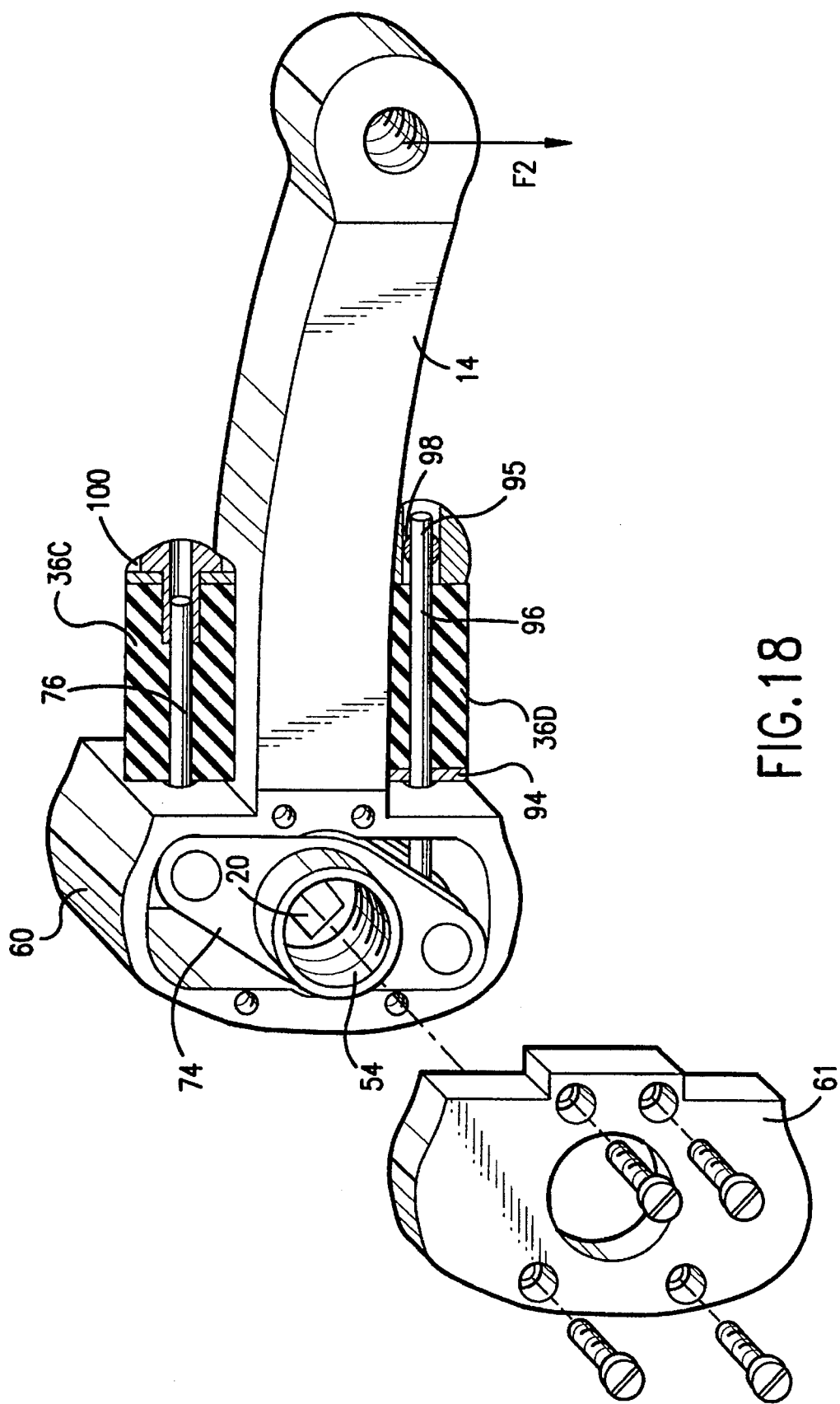
FIG. 18 is a partially exploded sectional perspective view of another alternative embodiment, with two elastic modules operating one in traction and the other in compression.

In FIG. 18, the housing 60 securedly united to the crank 14 houses an operating fork 74 mounted coaxially with the crank-gear spindle 20. The suspension device 36 comprises a first elastomer element 36C joined to the fork 74 by a connecting rod 76, and a second elastomer element 36D located on the same side. One of the front faces of the second element 36D has adjoined to it a washer 94 fixed to a rod 96, one of whose ends is connected to the fork 74 opposite the connecting point of the rod 74, and whose other end 95 passes freely through a spindle 98 linked to the crank 14 by a pivot link.

When the cyclist is pressing down on the pedals to generate the suspension function, the restoring torque between the cranks 12, 14 results from compression of the two elastomer blocks 36C, 36D. The first element 36C is compressed between the washer 100 and the housing 60 of the crank 14. The second element 36D is compressed between the washer 94 and the crank 14. When the pedalling function is performed, the internal active surfaces of the housing 60 of the crank 14 drive the fork 74 without compressing the elastomer blocks 36C, 36D.

The mechanism of FIG. 18 enables the reaction on the bearings to be reduced following balancing of the forces with respect to the crank-gear spindle 20.

Figure 19:
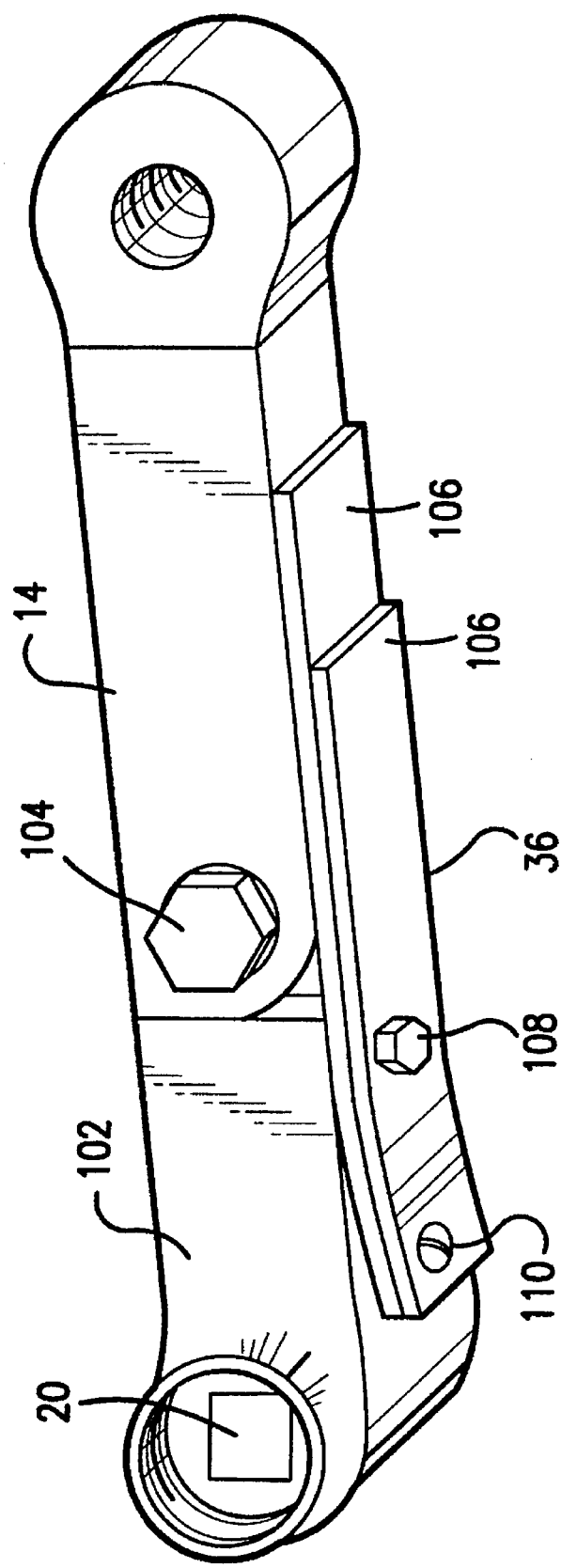
FIG. 19 is a perspective view of another alternative embodiment equipped with flection bars.

In FIG. 19, an operating arm 102 is securedly united to the crank-gear spindle 20, and bears at its end a spindle 104 on which the crank 14 is articulated. The suspension device 36 is formed by several bars 106 fixed onto the operating arm 102 by means of a nut and bolt 108 and a screw 110. The suspension function results from the flection of the bars 106 when the cyclist is pressing down on the pedal 24 exerting a force F2. It is obvious that this device could be fitted on the right side of the cycle, with an identical and symmetrical operation with respect to that of FIG. 19.

Figure 20:
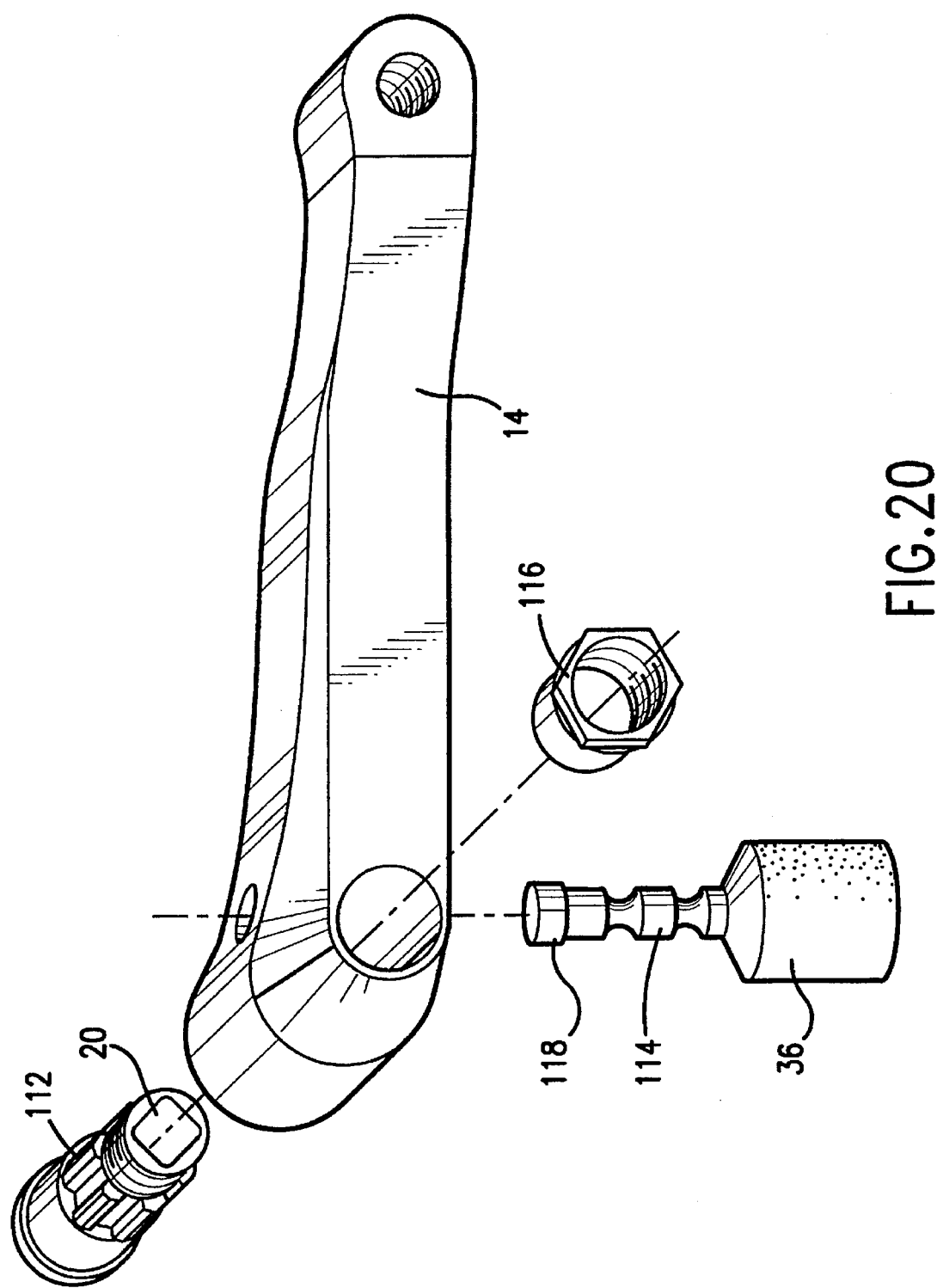
FIG. 20 is an exploded perspective view of another alternative embodiment, equipped with an engagement system.

In the example of FIG. 20, the pedalling device 10 comprises a partially grooved spindle 112 securedly united to the crank-gear spindle 20. The crank 14 is articulated on the spindle 112, and the suspension device 36 is associated to a grooved rod 114 cooperating by engagement with the grooves of the spindle 112 to compress the elastomer block of the suspension device 36 when the cyclist is pressing down on the pedals. A ring 116 is screwed onto the threaded end of the spindle 112. For the pedalling function, the bearing surface 118 of the grooved rod 114 is pressed up against the crank 14, which crank drives the crank-gear spindle 20 directly.

Figure 21:
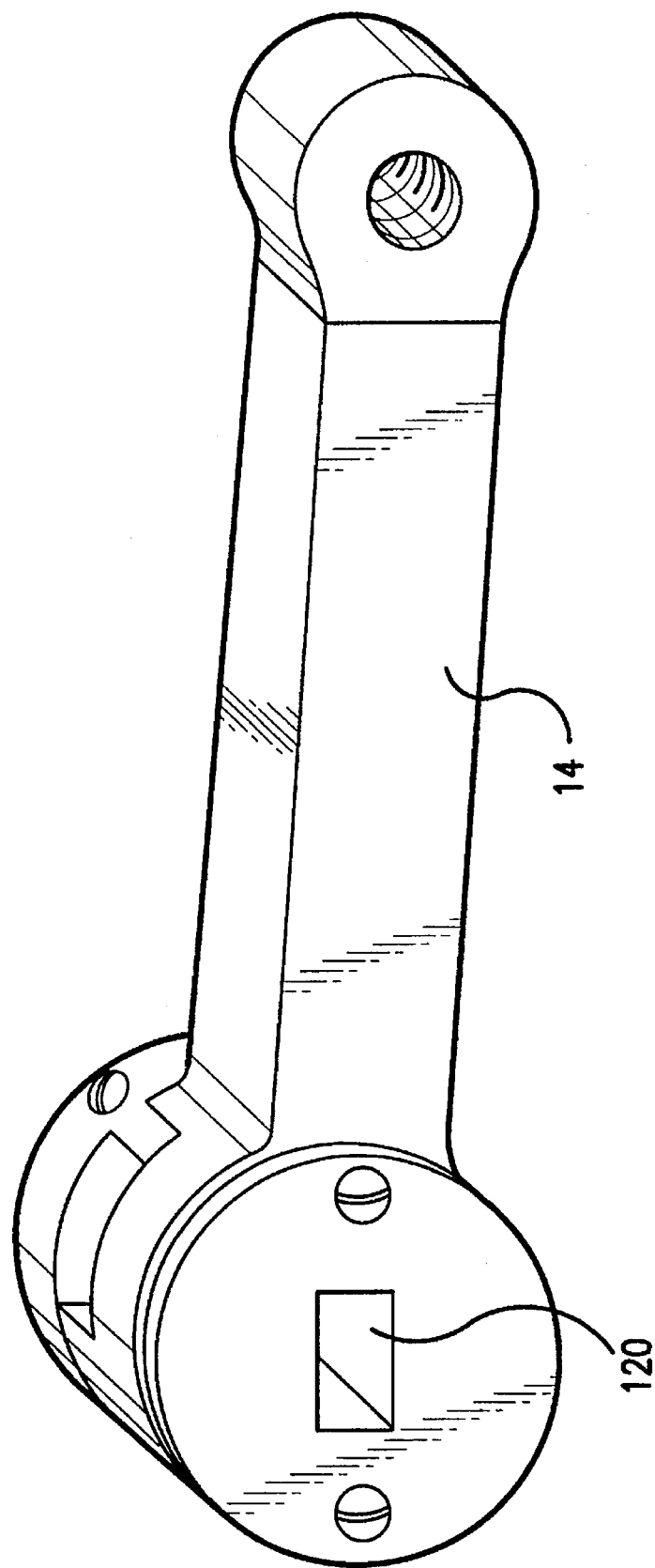
FIG. 21 is a perspective view of the left crank of another alternative embodiment with a torsion bar system.
Figure 22:
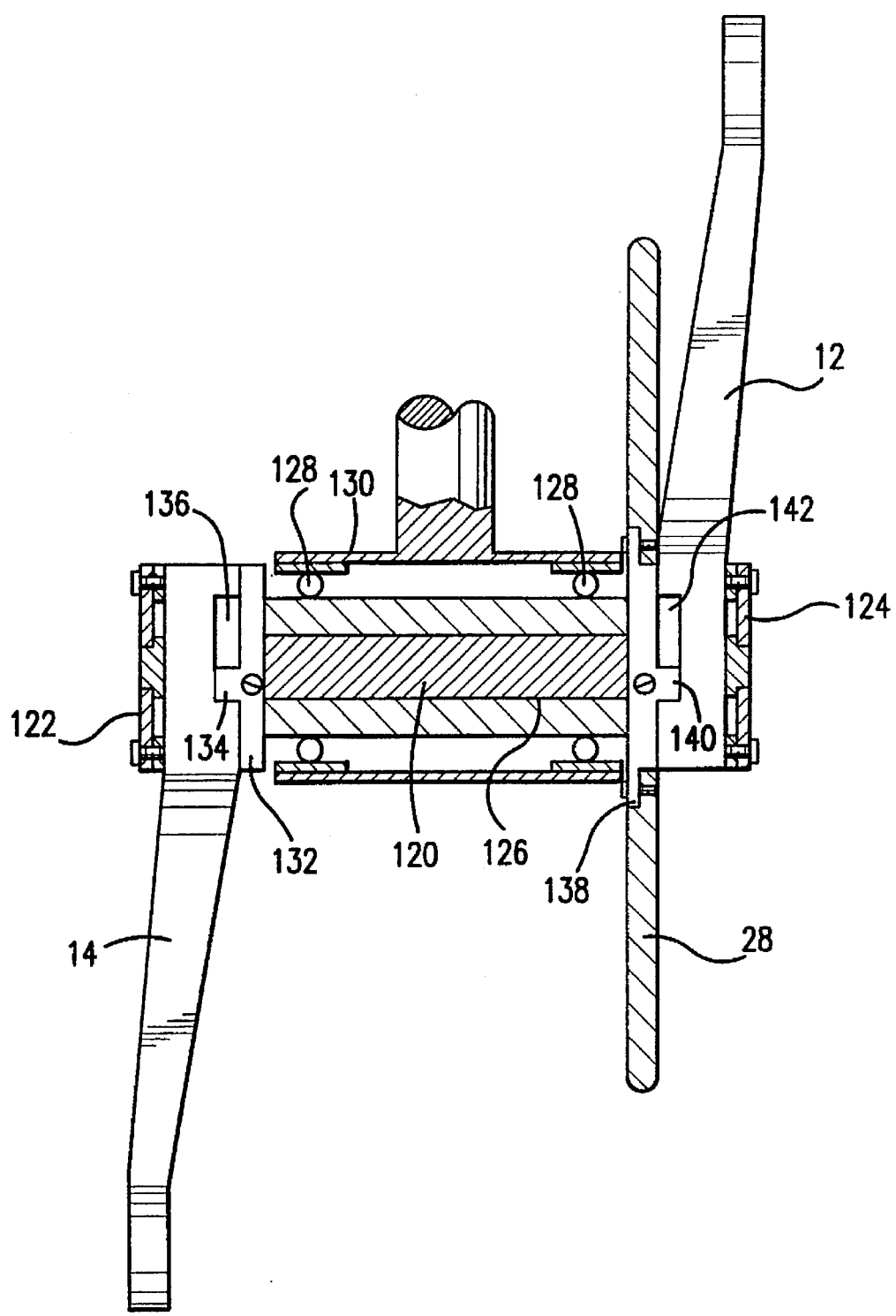
FIG. 22 represents an axial sectional view of the crank-gear according to FIG. 21, and enabling the suspension function to be achieved with either the left or right foot to the rear.

With reference to FIGS. 21 and 22, the suspension device 36 is formed by a torsion bar 120 fixed by its ends to flanges 122, 124 which are securedly united by screws to the cranks 12, 14. The torsion bar 120 is free in rotation inside a transverse driving spindle 126, which is mounted on bearings 128 in the crank-gear housing 130. A first stop ring 132 is fitted to the left-hand end of the driving spindle 126, and comprises a protuberance 134 housed in a groove 136 of the crank 14. A second stop ring 138 is mounted in similar manner on the right-hand end of the driving spindle 126, and is also equipped with a protuberance 140 arranged in a groove 142 of the crank 12. The transmission plates 28 are mounted on the second stop ring 138.

A suspension device of this kind operates with either the left foot or the right foot to the rear.

In the suspension phase, the torsion bar 120 is subjected to torsion stresses when the cyclist is pressing down on the pedals. This results in an angular offset of value θ between the cranks 12, 14, the protuberance 134 not being in contact with the first stop ring 132 when the cyclist is pressing down on the pedals with the left crank 14 in the rear position.

For the rear position of the right crank 12, the protuberance 140 is not in contact with the second stop ring 138, allowing formation of an angular offset between said ring 138 and the crank 12.

For the pedalling function, the protuberances 134, 140 are in engagement with the stop rings 132, 138 causing direct driving of the spindle 126 by the cranks 12, 14.

Figure 23:
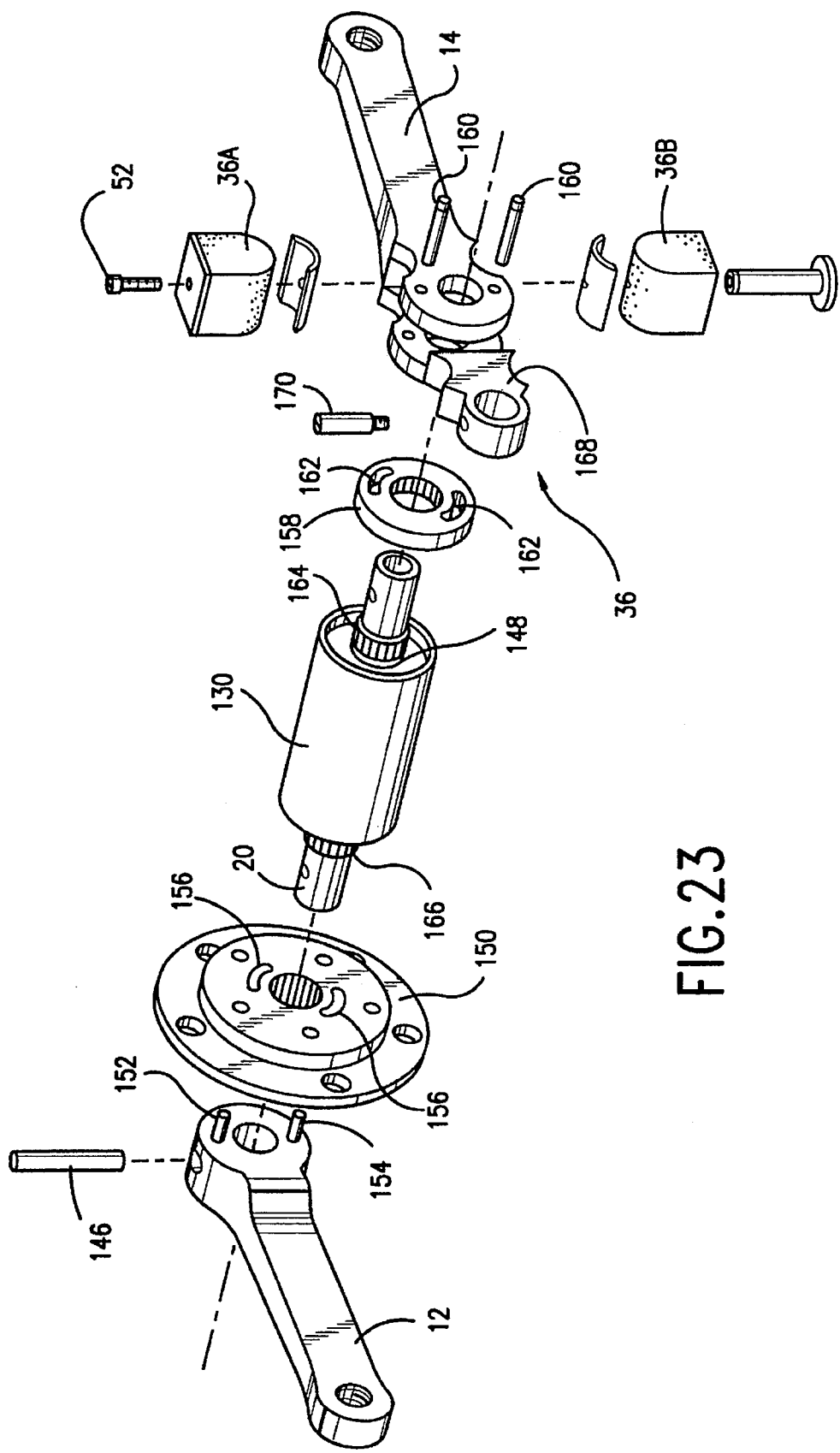
FIG. 23 is an exploded perspective view of another alternative embodiment enabling the suspension function to be achieved with the cyclist's right or left foot to the front.
Figure 24:
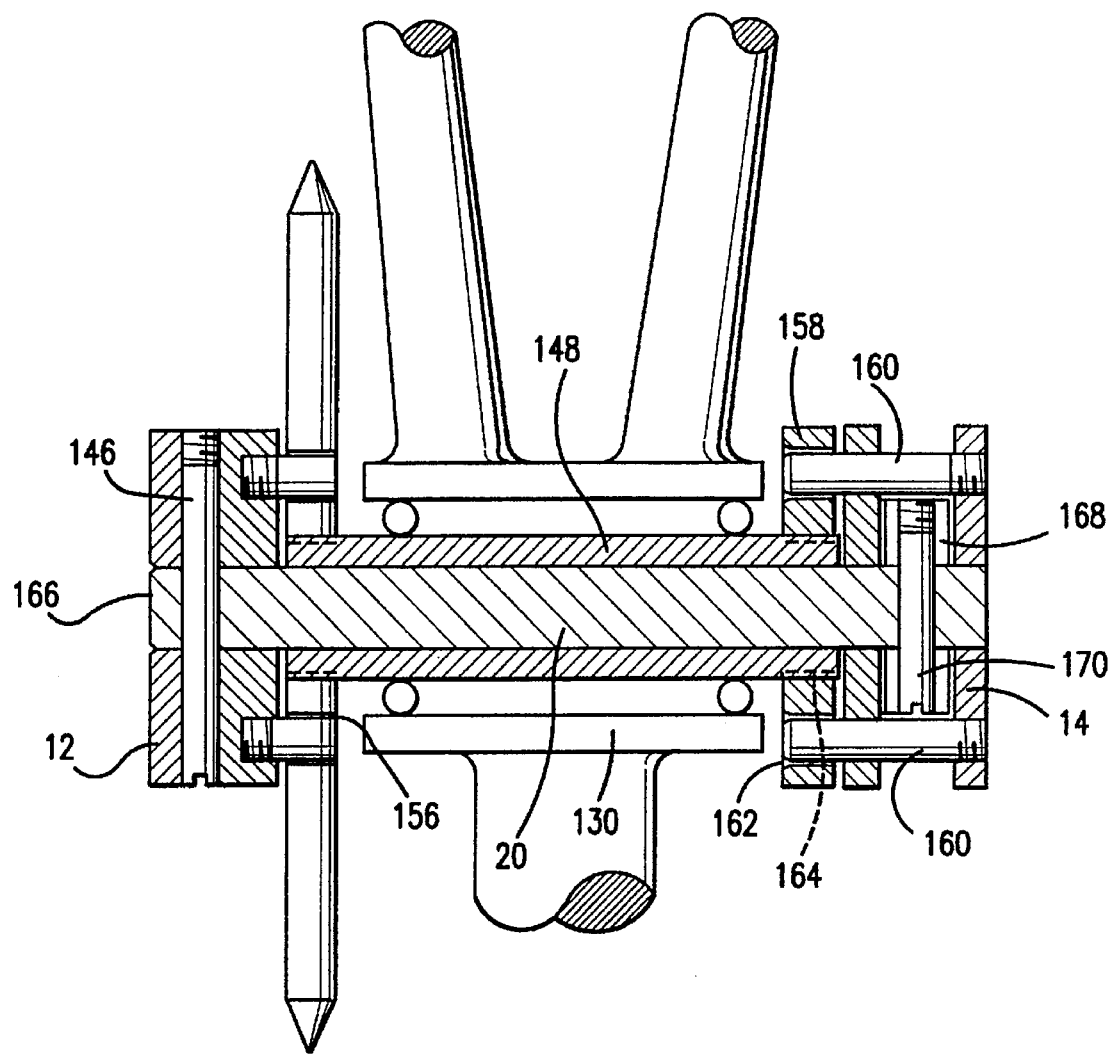
FIG. 24 is an axial sectional view of the fitted crank-gear according to FIG. 23.

With reference to the alternative embodiment of FIGS. 23 and 24, the suspension device 36 can be fitted on the right side or on the left side of the cycle, and nevertheless provide suspension of the cyclist with his right foot or left foot forwards. The crank 12 is securedly united to the crank-gear spindle 20 by means of the cotter pin 146. This spindle 20 is free in rotation inside the drum 148, itself free in rotation with respect to the housing 130 joined to the frame. The crank 12 drives the plate 150 supporting the toothed crown-wheels 28 by means of rods 152, 154 which engage in the oblong holes 156. The other crank 14 is articulated on the spindle 20 and drives the crown-wheel 158 in the pedalling direction, the rods 160 engaging in the oblong holes 162. The inside of the crown-wheel 158 is grooved and engages on the grooves 164 of the spindle 20, the other end 166 of which is itself engaged on the plate 150. In this way the crown-wheel 158 is rigidly joined to the plate 150. When pedalling takes place, the crank 14 drives the crown-wheel 158 followed by rotation of the transmission plate 150.

When the suspension function is performed, the crank 12 is rigidly joined to the operating arm 168 by means of the spindle 20 and cotter pins 146 and 170. If a force is exerted in the pedalling direction on one of the cranks and in the back-pedalling direction on the other crank, an angle will form between the arm 168 and crank 14, causing compression of the suspension means 36A, 36B. A two-way elastic link is this achieved between the two cranks 12, 14. The restoring force of this elastic link can be modified by means of the adjustment screw 52.

The oblong shape of the holes 156, 162 made respectively in the plate 150 and crown-wheel 158 allows relative rotation of the two cranks 12, 14.

I claim:

1. A pedalling device for pedal cycles, comprising:
   a first crank;
   a second crank;
   a pedal articulated at an end of each of said first and second cranks;
   a crank-gear spindle in mechanical connection with the first and second cranks and associated with transmission means having a toothed crown-wheel; and
   actuating means for providing a rigidly connected first pedalling state and a second damping state, the actuating means comprising a first operating part securedly united to the crank-gear spindle, a second operating part securedly united to at least one of the first and second cranks, and a suspension device coupled between the first and second operating parts, the first and second operating parts being rendered securedly united in the first pedalling state in which both of the first and second cranks are rotated in a positive driving direction effecting forward driving of the transmission means and rigid coupling of the cranks relative to the transmission means, and the first and second operating parts being independent from one another in the second damping state allowing flexible coupling of said first and second operating parts by the suspension device and relative rotation of the first and second cranks with respect to each other and the transmission means when opposing forces act on the first and second cranks.

2. The pedalling device according to claim 1, wherein the suspension device is associated to the second crank articulated on the crank-gear spindle, and comprising in addition:
   the toothed crown-wheel being coupled to one end of the crank-gear spindle, and having at least one oblong hole in which a transmission rod securedly united to the second crank engages;
   a support plate of the toothed crown-wheel coupled in rotation on another end of the crank-gear spindle;
   coupling means with rods to securedly unite the first crank to the plate; and
   a drum mounted with free rotation and extending coaxially with respect to the crank-gear spindle, the suspension device being arranged to perform a suspension function in multiple orientations of the pedalling device.

3. The pedalling device according to claim 1, wherein the suspension device is housed in a cradle of the second operating part, and comprises elastic means joined to the first operating part by a link rod, the suspension device being equipped with a prestress adjustment system to adjust relative movement of the first and second operating parts.

4. The pedalling device according to claim 1, wherein the first operating part comprises a lever housed in a housing securedly united to the one crank, the suspension device pressing against the one crank outside the housing.

5. The pedalling device according to claim 1, wherein the suspension device is equipped with a pair of modules working in series and joined to one another by a common connecting rod, the first module cooperating with an operating lever securedly united to the crank-gear spindle and with a first cavity of the one crank, and the second module being pressed in a second cavity of the one crank located opposite the first cavity.

6. The pedalling device according to claim 1, wherein the suspension device comprises a pair of modules working in parallel and joined by two connecting rods with opposite ends of an operating fork securedly united to the crank-gear spindle.

7. The pedalling device according to claim 1, wherein the first operating part comprises a lever coaxially mounted on the crank-gear spindle, and having a first arm bearing an off-centered articulation spindle of the one crank, the suspension device pressing on the one crank and being mechanically linked to a second arm by a connecting rod.

8. The pedalling device according to claim 1, wherein the first operating part is an operating arm securedly united to the crank-gear spindle and bears at an end thereof an articulation spindle of the one crank, the suspension device comprising a plurality of flection bars of elongated shapes fixed onto the operating arm and the second operating part by fixing means.

9. The pedalling device according to claim 1, wherein the suspension device is formed by a torsion bar securedly united to the first and second cranks, and mounted free in rotation inside a driving spindle, the actuating means comprising in addition:

a first stop ring fitted to a first end of the driving spindle and provided with a protuberance housed in a groove of the second crank; and a second stop ring fitted to a second end of the driving spindle, and provided with a protuberance arranged in a groove of the first crank, the toothed crown-wheel being securedly united to the second stop ring.

10. A cycle and pedaling device for providing a pedal suspension, comprising:

a cycle having a rear wheel mounted on a support frame of the cycle;

a first crank located on one side of the support frame;

a second crank located on an opposite side of the support frame;

a pedal articulated at an end of each of the first and second cranks and being actuated by a corresponding foot of a cyclist;

a crank-gear spindle in mechanical connection with the first and second cranks and associated with transmission means having a toothed crown-wheel and a chain driving the rear wheel, the cycle moving forward upon rotation of the first and second cranks in a positive pedalling rotational direction; and actuating means comprising a first operating part securedly united to the crank-gear spindle, a second operating part securedly united to a corresponding one of the first and second cranks, and a suspension device operably connected between the first operating part and the second operating part, wherein the first and second operating parts are rendered securedly united in a first pedaling state in which both of the first and second cranks are rotated in the positive pedalling rotational direction, allowing direct mechanical transmission of torque exerted by the pedals due to a rigid coupling in rotation of the first and second cranks with respect to each other and the transmission means, and further wherein the first and second operating parts are rendered independent from each other in a second damping state allowing flexible coupling by the suspension device of the first and second operating parts and relative rotation of the first and second cranks with respect to each other and the transmission means when opposing forces act on the first and second cranks.

11. The cycle and pedalling device according to claim 10, wherein the suspension device is housed in a cradle of the second operating part, and comprises elastic means joined to the first operating part by a link rod, the suspension device being equipped with a prestress adjustment system to adjust relative movement of the first and second operating parts.

* * * * *